United States Patent
Norris

(10) Patent No.: US 8,357,910 B2
(45) Date of Patent: Jan. 22, 2013

(54) BACKGROUND SIGNAL REDUCTION IN NEUTRON FLUORESCENCE APPLICATIONS USING AGILE NEUTRON BEAM FLUX

(75) Inventor: Wayne B. Norris, Santa Barbara, CA (US)

(73) Assignee: BOSS Physical Sciences LLC, Troy, MI (US)

( * ) Notice: Subject to any disclaimer, the term of this patent is extended or adjusted under 35 U.S.C. 154(b) by 11 days.

(21) Appl. No.: 13/130,786

(22) PCT Filed: Nov. 24, 2009

(86) PCT No.: PCT/US2009/065706
§ 371 (c)(1),
(2), (4) Date: May 24, 2011

(87) PCT Pub. No.: WO2010/060078
PCT Pub. Date: May 27, 2010

(65) Prior Publication Data
US 2011/0228903 A1    Sep. 22, 2011

Related U.S. Application Data

(60) Provisional application No. 61/117,300, filed on Nov. 24, 2008.

(51) Int. Cl.
*G01T 1/36* (2006.01)
(52) U.S. Cl. .................................... 250/390.01
(58) Field of Classification Search .............. 250/390.01
See application file for complete search history.

(56) References Cited

U.S. PATENT DOCUMENTS

| | | | |
|---|---|---|---|
| 4,851,687 A * | 7/1989 | Ettinger et al. | 250/390.04 |
| 5,076,993 A | 12/1991 | Sawa et al. | |
| 5,078,952 A * | 1/1992 | Gozani et al. | 376/159 |
| 5,410,575 A * | 4/1995 | Uhm | 376/159 |
| 7,151,815 B2 | 12/2006 | Ruddy et al. | |
| 7,505,544 B2 | 3/2009 | Jestice | |
| 2005/0069073 A1 | 3/2005 | Ogura et al. | |
| 2009/0114834 A1 | 5/2009 | Pekarsky | |

FOREIGN PATENT DOCUMENTS

| | | |
|---|---|---|
| EP | 1882929 A1 | 1/2008 |
| WO | WO90/16072 A1 | 12/1990 |
| WO | WO98/57194 A1 | 12/1998 |
| WO | WO2008/011052 A2 | 1/2008 |

\* cited by examiner

*Primary Examiner* — Marcus Taningco
(74) *Attorney, Agent, or Firm* — Endurance Law Group PLC

(57) ABSTRACT

Apparatus and methods for operating a neutron gamma fluorescence based system by modulating the interrogating neutron flux ($\phi_{Illumination}$) to allow for optimized signal-to-noise ratio (SNR) or to improve other detection parameter such as integration time. The apparatus includes one or more sensing systems to detect the range from the neutron source to an Area Under Investigation (AUI) or other parameters, one or more sensing systems to detect the return signal or signals caused by the interrogating neutrons, and a controller to receive inputs from the sensing systems, process them, and generate neutron beam modulation commands capable of being used by an agile neutron source to adjust its flux rate ($\phi_{Illumination}$) and/or other characteristics. Examples of possible embodiments include: radar, video, acoustic, or hybrid sensors to determine range; gamma ray, X-ray, electromagnetic, neutron, proton, acoustic, or hybrid sensors to determine return flux, and analog, digital, optoelectronic, or hybrid neutron beam controllers.

11 Claims, 4 Drawing Sheets

BACKGROUND SIGNAL REDUCTION IN NEUTRON FLUORESCENCE APPLICATIONS USING AGILE NEUTRON BEAM FLUX

FIELD OF THE INVENTION

The present invention relates generally to neutron beams of the type used for various substance detection applications, and more particularly toward the use of an agile neutron beam flux to reduce background signals encountered in remote detection and identification of substances of interest using neutron-gamma fluorescence.

BACKGROUND

The use of beams of neutrons to interrogate and locate substances at a distance is an emerging technology. As disclosed in the applicant's co-pending U.S. patent application Ser. No. 12/503,300, Filed: Jul. 15, 2009, the entire disclosure of which is hereby incorporated by reference and relied upon, a source of thermal, epithermal, or cold neutrons can be used to interrogate an Area Under Investigation (AUI) at a distance, and then detect and analyze gamma rays returning from the AUI in order to identify substance of interest in the AUI or its immediate surroundings.

Neutrons sent to interrogate an AUI will produce a broad range of reactions both in the AUI and also in virtually all other substances that are exposed to them, including, but not limited to: materials in the neutron source itself, including but not limited to shielding and the materials used to produce the neutrons; the intervening atmosphere with all its constituents; materials surrounding the AUI in all directions, including objects beside, in front of, and behind the AUI; and uninteresting substances commingled with the AUI. Signals resulting from such materials other than the AUI are referred to as "background signals" or, alternatively "nuisance signals".

Gamma rays resulting from neutron reactions are more readily detected at a distance than are other rays or nuclear particles resulting from those reactions.

The magnitude of the gamma ray reaction flux from each substance varies with the magnitude of the neutron flux delivered to that substance.

Both the neutron beam sent to interrogate the AUI and the returning gamma ray flux from the AUI and also the intervening and neighboring substances obey the so-called "$1/r^2$ rule" ("1-over-r-squared rule"), namely, that the flux density of each varies as the square of the distance between the radiation center and the point at which the flux is measured.

The combined effect of the $1/r^2$ rule on both the interrogating neutron beam and the returning gamma rays is the so-called "radar equation", or "$1/r^4$ rule" ("1-over-r-to-the-fourth rule")—returning gamma ray flux resulting from a neutron beam interrogation of an AUI and its surroundings varies as the fourth power of distance from each.

A final effect is the attenuation of both the interrogating neutron beam and the returning gamma ray signal. Such attenuation is exponential—both beams are attenuated by intervening air and other intervening substances, at an exponential rate.

The net effect of all these individual effects is that all signals returned to the detector vary strongly with the distance to the AUI and its surroundings.

Signals entering the detector are the sum of signals produced by a substance or substances of interest, if any are present, plus signals due to nuisance sources, artifacts, and background, collectively referred to as "Noise". The challenge for all detection systems of any type is the separation of signals due to items or substances of interest from signals due to noise. A key strategy for detection is the relative reduction of signals due to noise when compared to signals of interest. The ratio of total signal to signals due to noise is known as the "Signal-to-Noise Ratio" (SNR).

Since the statistical characteristics of signals of interest and signals due to noise are different from one another, effective separation of signals of interest from noise can be achieved by accumulating the total signal for a period of time, known as the Integration Time or Sampling Time ($\Delta t$), and then analyzing the accumulated signal. In general, a higher SNR allows a shorter Integration Time for the same level of detection confidence. Since Integration Time is virtually always critical, increasing SNR is always a desirable goal of a detection system, since it tends to reduce critical Integration Time.

In neutron gamma fluorescence detection systems, over a very broad range, signals returning to the detector from substances of interest scale directly with the flux of neutrons used to illuminate them, for a given distance to the AUI.

However, not all noise signals present in neutron fluorescence detection systems scale in the same way as signals from substances of interest. An entire significant class of noise signals, known as either "pulse pile up" or "random summing" noise, scales disproportionately with respect to illuminating neutron flux, at any given distance to the AUI, when compared to signals from substances of interest. When combined with the very large changes in total received signal with relatively small changes in distance to the AUI, the result of this behavior is that even small changes distance to the AUI can change SNR dramatically by changing "pulse pile up" or "random summing" noise faster than signals of interest change.

"Pulse pile up" or "random summing" noise at any given distance to an AUI can be adjusted for the best SNR and Integration Time by adjusting the illuminating neutron flux.

Therefore, there exists a need in the art to enable the agile adjustment of illuminating neutron flux with respect to the measured distance to the AUI, as well as with respect to other parameters, in order to allow optimization of SNR an Integration Time.

SUMMARY OF THE INVENTION

The present invention is directed to an apparatus and method for adjusting or modulating the illuminating neutron beam flux in neutron gamma fluorescence detection systems so as to optimize the system's figures of merit (FOMs) such as, but not limited to, the Signal-to-Noise Ratio (SNR) or Integration Time ($\Delta t$). These optimizations are achieved by reductions in the nuisance or noise signals when compared to the total received signal. The apparatus and method is used, among other applications, in the remote detection and identification of substances of interest when interrogating Areas Under Investigation (AUIs) in search of, or because such AUIs are suspected to contain, a substance or substances of interest using by neutron gamma fluorescence. This invention is broadly applicable to all neutron beam applications, whether the substances of interest are hidden explosive materials in roadside bombs or buried minerals of interest in mining operations or something altogether different. According to the principles of this invention, background noise effects are reduced relative to total received signal in any such application whether or not a substance of interest is actually found, since background noise, by definition, results from signals not associated with the substance of interest.

The invention comprises a device and method for sensing distance to target, characteristics of the intervening media between source and target, and/or other parameters, such as count-rate-per-channel in both transmitted and return signals, and using the values of these parameters to modulate the neutron flux to obtain the most accurate measures of the presence or absence of substances of interest in the Area Under Investigation (AUI).

As a hypothetical example, so-called "thermal" neutrons may be considered, with a mean energy of 0.026 eV, in which the 1/e distance for the thermal neutrons passing thru air is 22 meters and that of the induced 10.83 MeV gamma rays in air is 80 meters. The described behavior in this example may be expressed with the following equation:

$$\Phi_{GammaReturn} = K \cdot \Phi_{Illumination} \cdot \frac{e^{-\frac{x}{22}} \cdot e^{-\frac{x}{80}}}{x^4} = K \cdot \Phi_{Illumination} \cdot \frac{e^{-\frac{51x}{880}}}{x^4} \ldots \quad 1)$$

where . . .
$\Phi_{Illumination}$ is the outbound flux of neutrons;
$\Phi_{GammaReturn}$ is the returning gamma ray flux;
K is a constant combining all neutron reaction cross sections; and
x is the range in meters.

Thus, in this example, a hypothetical 1-meter change in x from 11 down to 10 meters results in a dramatic increase in $\Phi_{GammaReturn}$ of 55% as corroborated by the following calculation:

$$\Phi_{GammaReturn}(11 \text{ meters})/\Phi_{GammaReturn}(10 \text{ meters}) = (11/10)^4 \cdot (e^{561/880}/e^{510/880}) = 1.464 \cdot 1.060 = 1.551$$

The result of exponential attenuation's acting in combination with the radar equation thus results in a phenomenon in which small changes in detection range result in very large changes in return signal.

In addition to the nuisance signals resulting from the illumination of items other than the AUI, additional sources of nuisance signals in gamma ray detection devices include so-called "pulse pile-up" and "random summing". These nuisance signals arise from other time-coincident gamma rays induced in other atomic species in the environment of the AUI that randomly arrive so close together in time that they are detected as a single gamma ray with energy equal to their sum, rather than as individual gamma rays. Thus, for example, to illustrate the effect of random summing or pulse pile-up, consider a pair of gamma rays, one with energy 6.43 MeV and the other with energy 4.4 MeV that arrive in a detector so close in time that they cannot be distinguished from one another. These signals would be erroneously detected as a single gamma ray whose energy is the sum of their individual energies, 6.43 MeV+4.4 MeV=10.83 MeV. They would be indistinguishable from a single genuine 10.83 MeV gamma ray.

The totality of all gamma rays other than those of interest is called the "background flux" and is represented by the symbol $\Phi_{Background}$. The totality of all random-summing background flux events is called the "pulse pile-up flux" or "random summing flux" and is represented by the symbol $\Phi_{RandomSumming}$. This flux is a principle contributor to the total noise in the system, and thus is a principle focus of attention in the effort to improve the Signal-to-Noise Ratio, SNR, of neutron interrogation systems. SNR is one of the principal figures of merit of all such devices. It should be noted that the Integration Time needed to detect a signal with a specified degree of confidence varies inversely as the square of SNR:

$$\Delta t \sim 1/SNR^2 \quad 2)$$

for example, doubling SNR decreases integration time by a factor of four.

The shortest time interval between pulses that a gamma ray detector can distinguish as multiple events is the "time constant" of the detector, and is designated by the Greek letter $\tau$ ("tau"). The term "so close together in time", as used above, means in practice that detector cannot distinguish between a single gamma ray and the summed energy of two or more time-coincident gamma rays if those gamma rays arrive within a time interval less than $\tau$.

Both useful signal and background flux scale linearly with the illumination beam flux, $\Phi_{Illumination}$:

$$\Phi_{UsefulSignal} \sim \Phi_{Illumination} \quad 3a)$$

Or $$\Phi_{PUsefulSignal} = K_1 \Phi_{Illumination} \quad 3b)$$

where $K_1$ is an experimentally determined constant that takes into account the cross sections of the nuclides in the AUI, the distance, and other factors, and $$\Phi_{PBackground} \sim \Phi_{Illumination}. \quad 4)$$

The random summing flux is proportional to the time constant, $\tau$, and to the square of the background flux:

$$\Phi_{RandomSumming} \sim \tau \Phi^2_{Background} \sim \tau \Phi^2_{Illumination} \quad 5a)$$

Or $$\Phi_{RandomSumming} = K_2 \tau \Phi^2_{Illumination} \quad 5b)$$

where $K_2$ is another proportionality constant that takes into account the cross sections of the nuclides in the AUI, the distances, and other factors.

Thus, the use of faster detectors reduces background events in linear proportion to the time constant, but reduction in $\Phi_{Background}$ reduces nuisance events quadratically.

SNR due to random summing is the ratio of useful signal, $\Phi_{UsefulSignal}$, to random summing signal, which can be referred to as "noise":

$$SNR = \Phi_{UsefulSignal}/\Phi_{RandomSumming} \quad 6)$$

Thus, $$SNR \sim \Phi_{Illumination}/\tau \Phi^2 \text{Illumination} = 1/\tau \Phi_{Illumination} \quad 7)$$

Thus, SNR varies inversely with illumination flux and is best at the lowest value of $\Phi_{Illumination}$ consistent with high enough values of $\Phi_{Useful}$ to allow measurements to be taken at the speed required by operational constraints. It should be noted that the experimentally determined constants $K_1$ and $K_2$ in Equations 3b) and 5b) above could vary considerably, depending on the type of items being interrogated/illuminated at any given time.

As a numerical example, consider a case where:
$\Phi_{Illumination} = 10^9$ neutrons/sec;
$T = 10^{-6}$ sec (a value representing typical sodium iodide (NaI) scintillators);
$K1 = 10^{-5}$ gammas/neutron; and
$K2 = 10^{-7}$ gamma-sec/neutron$^2$
$\Delta t$=Integration Time=10 sec, a time determined in field tests In this case, $$SNR = \Phi_{UsefulSignal}/\Phi_{RandomSumming} = K_1 \Phi_{Illumination}/K_2 \tau \Phi^2_{Illumination} = K_1/K_2 \tau \Phi_{Illumination} = (10^{-5})*(10^9)/((10^{-7})*(10^{-6})*(10^9)^2) = 10^{-1}$$

An SNR of $10^{-1}=0.1$ has been determined in field tests to require 10 seconds of integration time for effective signal detection, a fairly long time.

However, cuffing the flux by the factor of 55% from the discussion of Equation 1) would increase SNR to 0.1/0.55 or 0.181—an improvement of 81%. At first view, integration time would be reduced by the square of this ratio—down 3 seconds, or 30% of its prior value. Integration time can only be reduced to the limit needed to accumulate enough statistics to find a substance of interest, if one exists. This ideal lower limit of Integration Time must generally be greatly exceeded in practice in order to overcome unfavorable SNR values. Increasing the SNR allows Integration Time to be reduced so as to approach this ideal lower limit as closely as possible.

As a second numerical example, consider scanning a 1-square-meter AUI containing a pile of trash at a distance of 10 meters, with the following parameters:

$\phi_{UsefulSignal}$=zero or 1 gamma rays per second at 10.83 MeV energy $\phi_{Background}$: 100,000 low energy (<1 MeV) gamma rays per second plus 10,000 gamma rays per second in the range 1-9 MeV, plus 1 pulse-pile-up per second mimicking a 10.8 MeV gamma ray.

SNR=less than 1 (No threat present)

As a third numerical example, consider scanning the same AUI with trash concealing a threat object $\phi_{UsefulSignal}$=10 gamma rays per second at 10.8 MeV $\phi_{Background}$: 100,000 low energy gamma rays per second plus 10,000 gamma rays per second in the range 1-9 MeV plus 1 pulse-pile-up per second mimicking a 10.8 MeV gamma ray.

SNR=10 (count rate at 10.8 MeV from a threat is 10 times higher than the count rate under non-threat conditions)

As a fourth numerical example, consider scanning a concrete wall at range 5 meters with full $10^{10}$ n/s beam $\phi_{UsefulSignal}$=zero or 1 gamma rays per second at 10.8 MeV $\phi_{Background}$: 200,000 low energy gamma rays per second, plus 20,000 gamma rays per second in 1-9 MeV range, plus 4 pulse-pile-ups per second mimicking a 10.8 MeV gamma ray.

SNR=less than 1 (no threat present)

As a fifth numerical example, consider scanning a wall concealing a threat object at 5 meters with full 10^10 n/s $\phi_{PUsefulSignal}$=10 gamma rays per second at 10.8 MeV (supposing the wall attenuates many of the detectable gamma rays from the threat)

$\phi_{Background}$: 200,000 low energy gamma rays per second, plus 20,000 gamma rays per second in 1-9 MeV range, plus and 4 pulse-pile-ups per second mimicking a 10.8 MeV gamma ray.

SNR=2.5=10 valid detection events/4 pulse-pile-up events.

As a sixth numerical example consider example 5, except the agile neutron flux is reduced by 0.5 when the distance sensor detects a large solid object at range 5 meters.

$\phi_{UsefulSignal}$=5 gamma rays per second at 10.8 MeV from the concealed threat object.

$\phi_{Background}$: 100,000 low energy gamma rays per second, plus 10,000 gamma rays per second in range 1-9 MeV, plus 1 pulse-pile-up per second mimicking a 10.8 MeV gamma ray.

SNR=5=(5 detected valid events/1 pulse-pile-up event).

The present invention improves upon prior art by using target-distance measurement, other parameters, and computerized algorithms to modulate the neutron beam flux to produce an optimal reduction $\phi_{RandomSumming}$, so as to reduce total system noise and improve or optimize SNR and Integration Time.

The various embodiments of the present invention use optical, radar, acoustic, or other sensors, as well as measurements of $\phi_{Background}$ itself, and/or a sensor fusion signal from multiple sensor channels, to adjust $\phi_{Illumination}$ to keep SNR and Integration Time optimum. The term "agile" when applied to a neutron beam or neutron source means the capability of the neutron beam and/or its neutron source to be modulated in flux rate (neutrons per second) in response to automatic control signals.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENTS

References in this document to "one embodiment", "an embodiment", "some embodiments", or similar linguistic formulations means that a particular feature, structure, operation, or characteristic described in connection with those embodiments is included in at least one embodiment of the present invention. Thus, the appearances of such phrases or linguistic formulations in this document do not necessarily refer to the same embodiment. Further, various particular features, structures, operations, or characteristics may be combined in any suitable manner in one or more embodiments.

Figure 1:
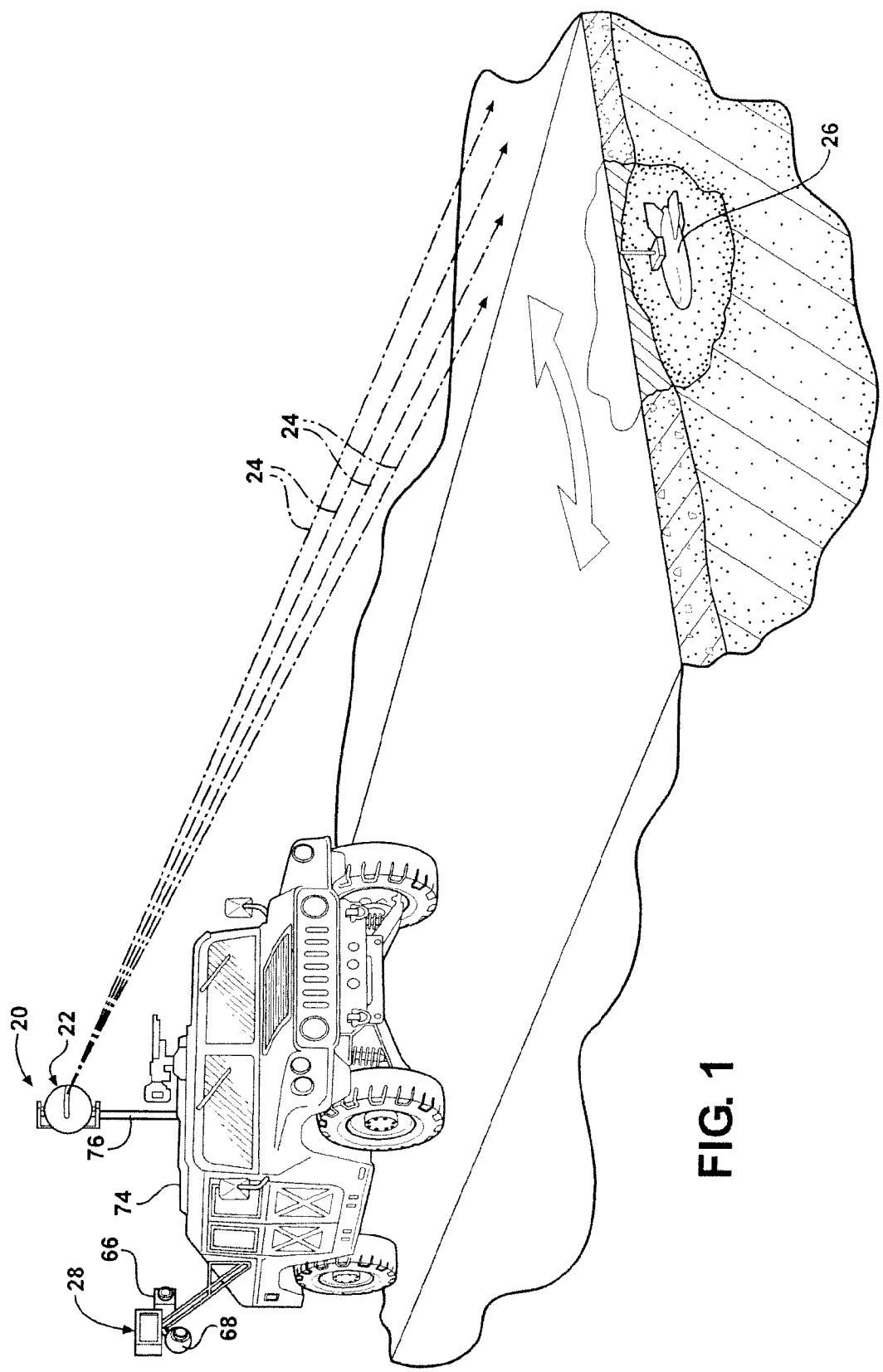
FIG. 1 is a perspective view showing one exemplary embodiment of the subject invention wherein the apparatus is carried in a land vehicle such that the neutron source is supported in a position for scanning a search area which, in this case, is a roadway having buried therein an AUI which in this example is an improvised explosive device (IED)
Figure 3:
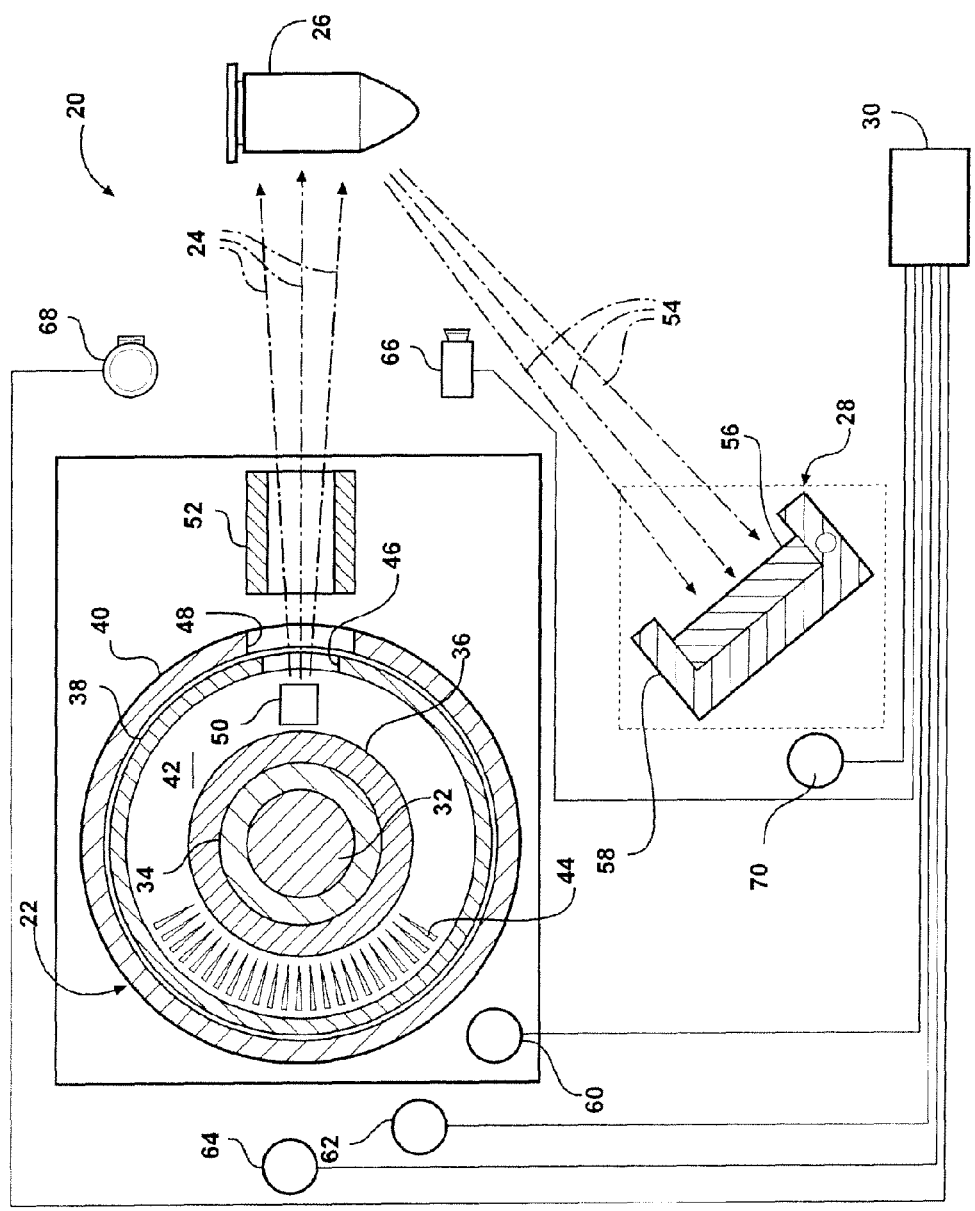
FIG. 3 is a schematic representation of the subject apparatus for detecting remote explosive substances in an AUI according to one embodiment of this invention.

FIGS. 1 and 3 illustrate graphically an exemplary apparatus 20 for detecting remote explosive substances in accordance with one embodiment of the present invention. (Conventional elements, such as housings, mountings, supports, electrical power supplies, etc. are shown in greatly simplified form or omitted altogether for ease of illustration.) The apparatus 20 has a neutron beam generator 22, which directs a neutron beam 24 across a search area that contains one or more remote suspicious AUIs 26. An AUI 26 that actually contains a substance of interest may be generally defined as a hostile, hidden or suspicious object that has the potential to harm people or property or which is valuable or otherwise desirable to locate. In one implementation of this invention, an AUI 26 is an improvised explosive device (IED) or bomb, although in other embodiments, it may be minerals of interest or other targets to be identified and/or located. The apparatus 20 also includes a gamma ray detector 28 and a plurality of data collection modules and sensors (described in more detail below), along with a detection processing module 30. These several main components of the apparatus 20 are first broadly described by their sub-components, and then each sub-component is described in further detail.

The neutron beam generator 22 directs a neutron beam 24 along a vector towards the search area. As shown schematically in FIG. 3, a fast neutron source 32 is surrounded by an optional neutron amplifier 34, which increases the number of fast neutrons prior to their moderation. The optional neutron amplifier 3 is surrounded by a neutron moderator 36, which slows some or all of the fast neutrons to thermal, epithermal, or cold energies. In one embodiment, a movable, e.g., rotatable, neutron shield system 38, 40 enclose a void 42. However, it is to be understood that the shielding system may be non-movable or fixed relative to the neutron source 32. The neutron moderator 36, optional neutron amplifier 34, and the fast neutron source 32 are contained within the void 42. Also located in the void 42 is an optional neutron focusing element 44. In the moveable shield embodiment, each shield 38, 40 defines an aperture, apertures 46 and 48 respectively, which cooperate as a beam former to direct the neutron beam 24 along a vector. In other words, the overlap between the first 46 and second 48 apertures allows a projected beam 24 of neutrons to escape from the generator 22 so that the beam 24 can be scanned across a search area suspected to contain one or more hostile AUIs 26. An optional neutron amplifier 50 within the void 42 and immediately before the overlapped region of the apertures 46, 48 can be used to increase the number of neutrons in the neutron beam 24. A neutron beam-forming component 52, situated along a path of the neutron beam 24, can be used in cooperation with the apertures 46, 48 to further focus the neutron beam 24. Various examples of a neutron beam-forming component 52 can be used, and are not limited to the illustrated example.

The gamma ray detector 28 is used to detect gamma rays 54 emitted from the remote AUI 26. Preferably, the gamma ray detector 28 is spaced apart from the neutron beam generator 22 by several meters, e.g., three meters. Substances of interest within the remote AUI 26 will radiate gamma rays 54 with characteristic emission spectra when bombarded by neutrons. A portion of these gamma rays 54 are intercepted by a gamma ray spectrometer 56 portion of the gamma ray detector 28. The spectrometer 56 is shielded from nuisance gamma rays originating from sources other than the remote AUI 26 by a gamma ray shield 58.

Neutron source status information is collected from a plurality of sensors within or near the neutron source 32 and reported via data channel 60. Furthermore, two position sensors 62 and 64, one for each shield 38, 40, monitor the instantaneous positions of the respective shields 38 and 40, and therefore are capable of discerning the vector position or orientation of the neutron beam 24 at any moment in time. An optional imaging sensor (e.g., a video camera or its functional equivalent) 66 may be provided, along with a distance sensor 68, and a gamma ray detector data collection module 70. The two position sensors 62, 64 determine the positions of the two apertures 46, 48, respectively. Each of the two position sensors 62, 64, the data channel 60, the optional imaging sensor 66, and the distance sensor 68 collects and transmits its data to the detection processing module 30. The gamma ray detector data collection module 70 collects and transmits one or more streams of data from the gamma ray detector 28 to the detection processing module 30. The position sensor 62 (and likewise 64) can be of the well-known encoder-type which may be either separately fitted to some movable portion of either shield 38, 40, or may be incorporated directly into the motor drive system which controls movement of the respective shields 38, 40.

The optional imaging sensor 66 also allows for the system to be switched off temporarily, either manually or automatically, if the imaging sensor detects the images of civilians or other sensitive elements in the scene downrange of the neutron beam. After determining that the area is clear of sensitive elements, the beam can be switched on again, either manually or automatically.

The detection processing module 30 processes data, including but not limited to neutron source status information collected from a plurality of sensors within the neutron source and reported via data channel 60, position data provided from the two position sensors 62, 64, the optional imaging sensor 66, the distance sensor 68, and the gamma ray detector data collection module 70. Based on the provided data, the detection processing module 30 determines whether the remote AUI 26 contains any substances of interest, as well as the location of the remote AUI 26 by inference from the orientation of the beam vector at the moment in time when the gamma ray detector 28 senses the incoming gamma rays 54 from the AUI 26.

A compact fast neutron source 32 may be preferred because it is portable, simple to construct, and a convenient source of significant neutron flux. Alternative types of such neutron sources 32 may be used in various circumstances. For portable field operations, the maximum dimension of the neutron source 32 should be minimized to the extent practical. Numerous types of known fast neutron sources have a maximum dimension smaller than approximately 300 cm, as is desirable here, including but not limited to spontaneous fission radioisotopes, accelerator-based sources, alpha reactions, photofission, and plasma pinch. Some embodiments have spontaneous fission neutron sources using radioactive isotopes, such as Californium-252. In some embodiments, neutrons are produced by sealed tube or accelerator-based neutron generators. These generators create neutrons by colliding deuteron or triton beams into targets containing deuterium or tritium, causing fusion with attendant release of neutrons. Some embodiments have alpha reaction sources, in which alpha particles from alpha-radioactive isotopes, such as polonium or radium, are directed into targets made of low-atomic-mass isotopes, such as beryllium, carbon, or oxygen. An embodiment may also use photofission sources, including beryllium, in which gamma rays are directed into nuclei capable of emitting neutrons under certain conditions. Another kind of neutron source is the plasma pinch neutron source or fusor source, in which a gas containing deuterium, tritium, or both is squeezed into a small volume plasma, resulting in controlled nuclear fission with attendant release of neutrons. Pulsed neutron generators using the fusor technique are also commercially available.

As shown in FIG. 3, the fast neutron source 32 is preferably surrounded by a conventional neutron amplifier 34, which increases the number of fast neutrons prior to their moderation by the neutron moderator 36. Neutron amplifiers 34 emit more neutrons than they absorb when irradiated by neutrons. Known materials used as fast neutron amplifiers include, but are not limited to, thorium, lead, beryllium, americium, and non-weapons-grade uranium and plutonium. Since the most common neutron amplifiers 34 operate on high energy neutrons, some embodiments may include one or more high energy neutron amplifiers or pre-moderator amplifiers, thereby maximizing the number of neutrons in the neutron beam for a given power dissipation, physical size, cost, and weight. Other types of neutron amplifiers 34 which may be used for this invention operate on thermal energy neutrons. Therefore, some embodiments may include a thermal neutron or post-moderator amplifier 50 as well.

Because the neutrons produced by the fast neutron source 32 and the optional pre-moderator amplification stage 34 have energies tens to hundreds of millions of times larger than the energies required for thermal, epithermal, or cold neutrons in the present apparatus 20, some or all of the neutrons may be slowed down to those energy ranges—energies in thermal equilibrium with nominally room temperature surroundings (~0.026 eV) or energies somewhat above or below thermal energies—by the neutron moderator 36. This process is known as neutron moderation or thermalization.

Neutron moderation is conventionally achieved by scattering or colliding the neutrons elastically off light nuclei that either do not absorb them or else absorb them minimally. Since the light nuclei are of the same rough order of magnitude in mass as the neutrons themselves, each neutron imparts significant energy to each nucleus with which it collides, resulting in rapid energy loss by the neutrons. When the neutrons are in thermal equilibrium with their surroundings, a given neutron is just as likely to get an energy boost from a slightly faster-than-average nucleus as it is to lose a slight amount of energy to a slightly slower-than-normal molecule. As a result, neutrons in thermal equilibrium with their surroundings remain in equilibrium. Among the most effective moderator nuclei are deuterium and carbon-12, since they are light and do not absorb appreciable number of neutrons. Light hydrogen is also an effective moderator because, although it absorbs a small number of neutrons, its extremely low atomic weight of 1 allows for extremely efficient moderation. Polyethylene, containing carbon and light hydrogen, is thus an effective moderator compound as well.

As shown in FIG. 3, neutron moderation can be achieved by passing fast neutrons emanating from the source 32 through the neutron moderator 36. Some of the optional types of neutron sources mentioned above produce neutron beams (anisotropic sources), while others produce neutrons with trajectories radiating equally in all directions (isotropic sources). Nevertheless, the effect of moderation, with its numerous elastic scattering events per moderated neutron, yields a fairly isotropic distribution of neutron trajectories. For this reason, one particularly desirable shape for the neutron moderator 36 is a hollow sphere with the fast neutron source 32 and the optional pre-moderator amplifier 34 inside. For a deuterium oxide ("heavy water") moderator 36, the thickness required to moderate nearly 100% of deuterium-deuterium fusor-source neutrons having energies of the order of 2.45 MeV to thermal energies is of the order of 30 cm; for a graphite moderator, the thickness is greater. See, e.g. G. Friedlander et al, Nuclear and Radiochemistry (3d ed., Wiley and Sons 1981). The actual moderator 36 may be thinner than this, if some energetic neutrons are to be left in the beam 24.

Figure 2A:
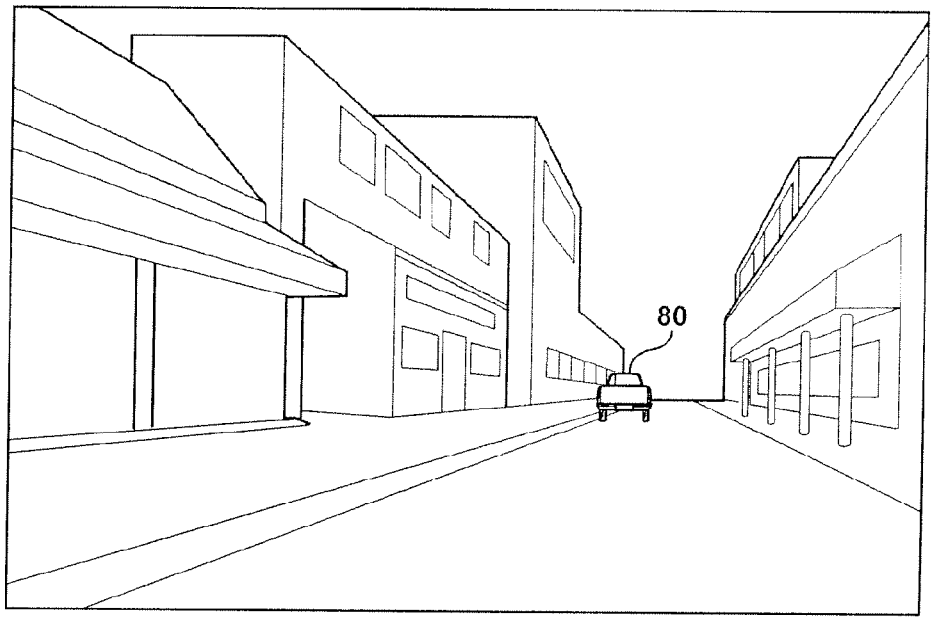
FIGS. 2A and 2B show, respectively, forward-looking perspective views as might be encountered by the driver of a vehicle carrying the apparatus and implementing the method of this invention wherein building structures line the sides of a roadway and a parked vehicle lies ahead, with FIG. 2B depicting in exemplary fashion a scanning path for a neutron beam according to the subject invention with a flash-like response representing the generation of gamma rays which occurs when the neutron beam interacts with substances of interest, e.g., nitrogen, in a hostile AUI.

Simply sending thermal neutrons into space in all directions would not allow a target of interest to be located spatially within a search area. For this reason, it is useful to scan the surrounding landscape with neutron beam 24. FIG. 2A is an exemplary perspective view as may be perceived by a person operating the subject apparatus 20. In the most practical embodiment of this invention, the apparatus 20 is mounted on a mobile carrier 74 which, as shown in FIG. 1, may take the form of an armored land vehicle. However, other carrier 74 embodiments can be envisioned, including tailored land vehicles, marine vessels, aircraft and the like. In other words, the carrier 74 may comprise any structure capable of supporting the neutron source 32 opposite a search area. Thus, in FIG. 2A, the perspective view may be that of an area suspected to contain one or more hostile targets such as bombs or explosive devices which could be hidden in any conceivable location below the ground, on the ground or above the ground. Thus, as the search area is approached, an operator of the apparatus 20 upon perceiving the view presented in FIG. 2A, will not be able to accurately predict where a substance of interest may reside, and therefore the entire region may be methodically interrogated. During the time each small area or object is interrogated with the neutron beam 24, that area or object is the AUI 26. For this reason, the apparatus 20 is constructed so that the neutron beam 24 can be scanned across the search area or otherwise methodically interrogate each suspected hiding place for substances of interest.

Figure 2B:
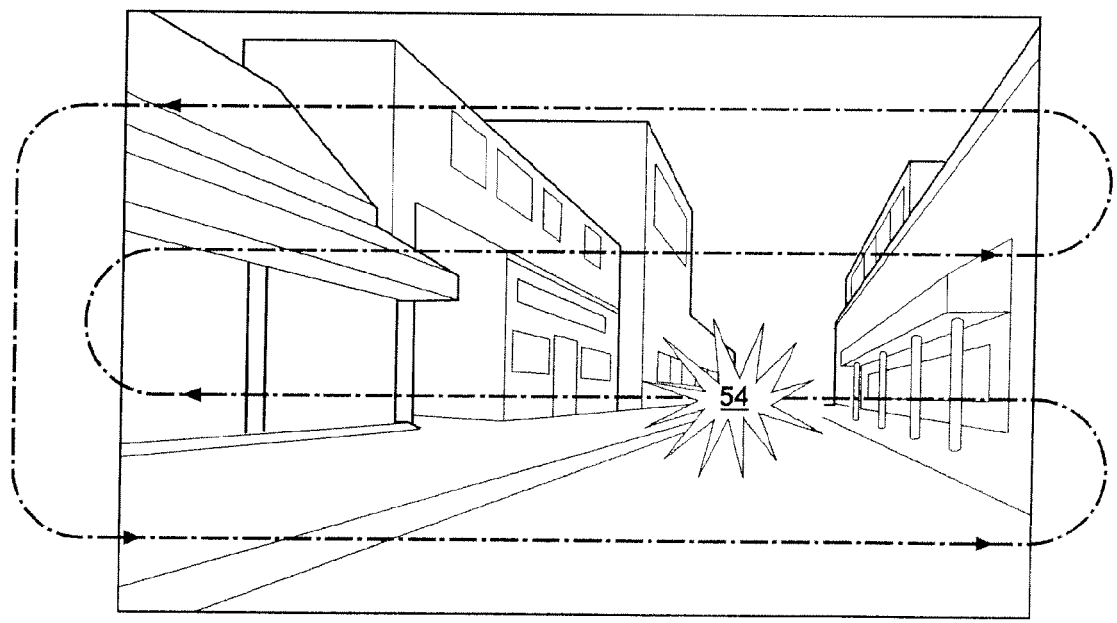

For example, the circuitous dashed lines in FIG. 2B represent a methodical, serpentine-like back-and-forth scanning of the search area with the neutron beam 24 over a defined period of time. In other words, if for example a motor carrier 74 were stationary, the back-and-forth scanning of the search area may take the form illustrated in FIG. 2B. Of course, other scan path methodologies can be used including up-and-down, circular, zig-zag or other scanning patterns as may be deemed appropriate. In these examples, a hostile target, e.g., IED, is hidden within a vehicle 80 parked along the roadside in the search area and contains a substance of interest, e.g., nitrogen. When the neutron beam 24 interrogates the vehicle 80 as an AUI 26, a flash of gamma rays 54 is produced because this particular AUI contains the particular substance of interest, nitrogen in this case. The fluoresced gamma rays 54 are detected by the gamma ray detector 28. The position sensors 62, 64 are effective to specify the orientation of the neutron beam vector at the moment the gamma rays 54 are detected by the detector 28 so as to locate the substance-containing AUI 26 in the search area. Of course, means other than the position sensors 62, 64 may be used to infer the location of the substance of interest, especially in cases where the shielding system is not rotatable.

This invention relates to improvements related to the modulation of the neutron beam 24 flux produced by an apparatus 20 as shown schematically in FIGS. 1 and 3 with an example of operations as shown in FIGS. 2A and 2B.

In the example shown in FIG. 2B, the distance between the disclosed device and the illuminated target area varies considerably as the neutron beam interrogates objects far and near along the path shown by the broken lines indicated with arrows. As described earlier, the flux of the gamma ray signal 54 received by the gamma ray detector 28 varies not only with the presence or absence of an item of interest, but also with distance to the area being illuminated as well as the materials in the area being illuminated. As also described earlier, the Signal-to-Noise Ratio SNR is optimum when the illumination flux $\phi_{Illumination}$ from the neutron source is as low as possible, consistent with high enough values of $\phi_{Useful}$ to allow measurements to be taken at the speed required by operational constraints. Thus, in the example in FIG. 2B, and referring to the components of the disclosed device in FIGS. 3 and 4, the distance sensor 68 continually passes distance-to-target (i.e., distance-to-AUI) information to the detection processing module 30 as one parameter to be used in the computation of the optimal value of illumination flux $\phi_{Illumination}$. Additional inputs to detection processing module 30 for this same purpose include, for example, the gamma ray flux detected by the telescope as reported by gamma ray detector data collection module 70 and beam position as sensed by position sensors 62 and 64. Such inputs are used by the detection processing module 30 to compute the required level of neutron flux. Commands to produce this level of neutron flux are passed to neutron source controller unit 90. This computation is done continuously, with new commands issued by detection processing module 30 as they are needed.

Figure 4:
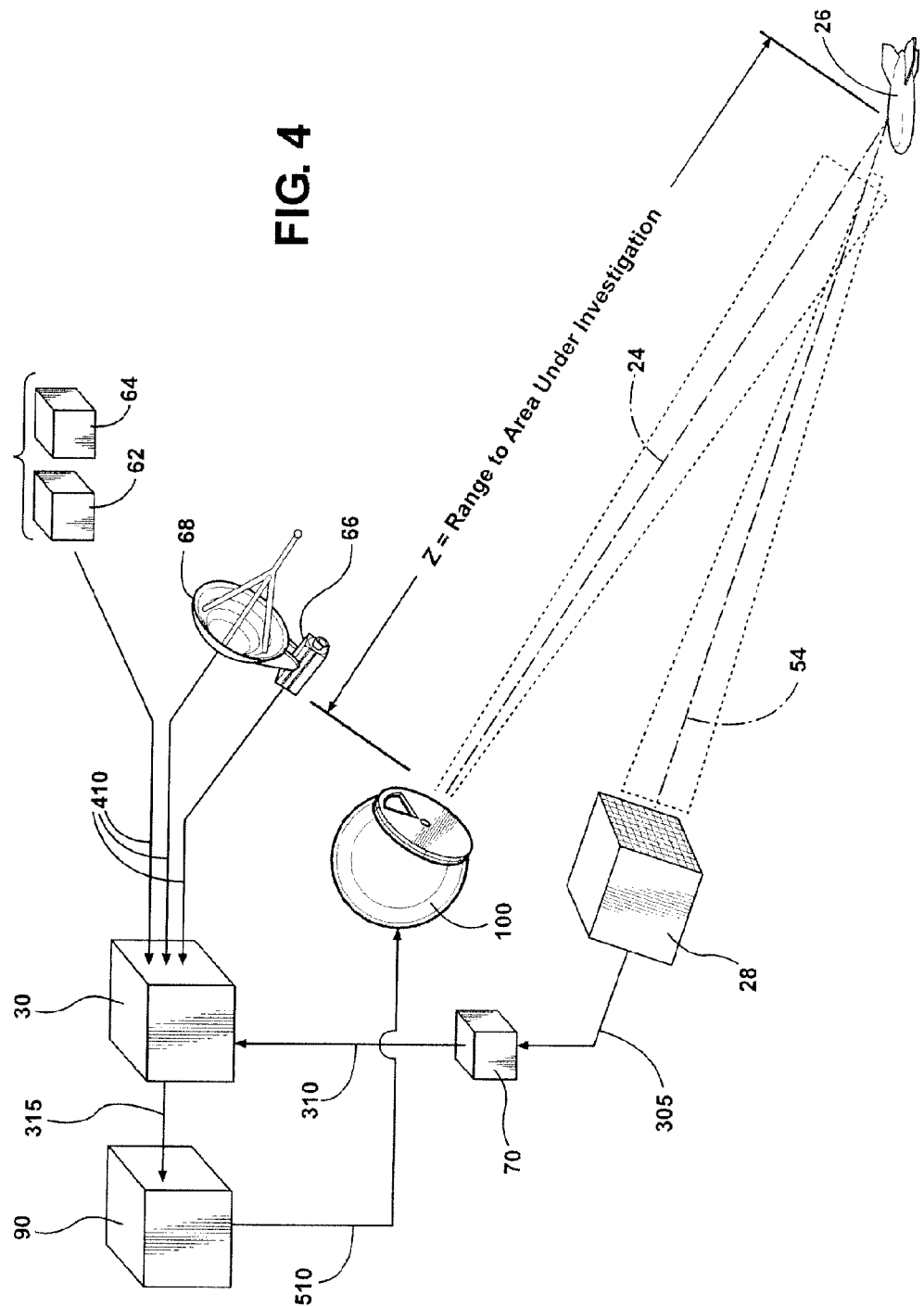
FIG. 4 shows a functional graphic diagram of one embodiment of an apparatus for reducing background signal in neutron fluorescence applications.

FIG. 4 illustrates graphically the details of an apparatus like that described in FIG. 3 but with enhanced functionality for reducing background signal in neutron fluorescence applications. For the sake of clarity, new reference numbers are ascribed in FIG. 4 for items not included in the earlier work, and likewise elements such as housings, mountings, supports, electrical power supplies, external radiation shielding, etc. are omitted from view. The apparatus has four main components: (1) an agile neutron source 100, which corresponds to the neutron generator 22 in FIG. 3, whose agility was not specified; (2) the detection processing module 30, as shown in FIG. 3; (3) range and/or other parameter measurement sensors: distance sensor 68, optional image sensor 66, position sensors 62 and 64, and optionally others; and neutron source modulation controller 90. The AUI is shown trivially as 26, despite the fact it is not a part of the invention.

The neutron source 100 is of the agile type, in which its neutron flux and/or other parameters can be controlled by means of a command input. The gamma ray detector data collection module 70 connects to the gamma ray detector 28 shown in FIGS. 1 and 3 and collects and reports data reflecting the gamma ray flux. The gamma ray detector 28 detects the return signal or signals caused by the interrogating neutrons, and may be configured as a gamma ray detection system, an X-ray detection system, an electromagnetic wave detection system, a neutron detection system, a proton detection system, an acoustic detection system, or even as a hybrid system, based on one or more single-modality-based systems.

The optional imaging sensor 66 and the distance sensor 68 detect the range from the neutron source 100 to the AUI or other parameters, and may be of the electromagnetic wave-based type, optical-based type, sonic-based type, acoustic-based type, or a hybrid system based on one or more single-modality-based systems.

The neutron flux of the entire described neutron beam generator 100 is controlled by neutron source controller unit 90. The details of operation of this controller may vary from one embodiment to another, and may include, for example, plasma excitation current for plasma ion source-based devices, accelerator beam current for accelerator based units, and other strategies for sources relying on other physical phenomena for neutron production. Neutron source controller unit 90 responds to commands generated by the detection processing model 30. This module includes of one or more computer programs or similar device control logic units that accept inputs from a plurality of sensors and use algorithms to compute the required neutron flux and generate the appropriate commands to neutron source controller unit 90 to achieve that required neutron flux. Examples of inputs to the detection processing module 30 include but are not limited to varying measures of the distance to the target, such as that provided by distance sensor 68 and/or optional imaging sensor 66, to detected gamma ray flux such as that provided by gamma ray detector data collection module 70, and to beam position as sensed by position sensors 62 and 64, The neutron source modulation controller 90 may be integrated with the detection processing module 30, or configured as a stand-alone component that interfaces with the previously described detection processing module 30. The detection processing module 30 receives inputs from all the sensing systems mentioned above, processes them, and determines an optimum neutron flux. The detection processing module 30 then sends a neutron beam modulation command (or commands) capable of being used by the agile neutron source 100 to adjust its flux rate and/or other characteristics to the required levels. The neutron source modulation controller 90 may be structured as an analog system, a digital system, an optoelectronic system, or as a hybrid system, based on one or more single-modality-based systems. The various contemplated embodiments of this invention will use optical, radar, acoustic, or other sensors, as well as measurements of $\phi_{Background}$ itself, and/or a sensor fusion signal from multiple sensor channels, to adjust $\phi_{Illumination}$ and thereby optimize the SNR.

As can be seen in FIG. 4, a beam of neutrons 150 is produced by the agile neutron source 100, directed toward the AUI 26. The AUI and its surroundings, plus the neutron source itself, as well as interposing items such as the atmosphere, produce a fluorescence gamma ray signal as well as potentially other radiation signals. These signals 54 are sensed by the gamma ray and/or other radiation detector(s) 28. Gamma ray flux measurements 305 are sent to gamma ray detector data collection module 70, which uses these measurements to determine gamma ray count rate and other parameters 310. Commands based on parameters 310 are sent to detection processing module 30. In addition, one or more range and/or other parameter measurement sensors 62, 64, 66, and 68 send signals 410 to detection processing module 30. Using algorithms, detection processing module 30 computes required neutron flux and sends commands for required neutron flux 315 to source modulation controller 90. Using control logic, the neutron source modulation controller 90 sends neutron beam modulation commands 510 to the agile neutron source 100, causing its output to be adjusted to achieve the neutron flux levels it was commanded to achieve by the detection processing module 30.

Accordingly, the subject invention proposes a practical method for increasing the valuable metrics of a neutron fluorescence device related to its utility in the detection of items of interest in an AUI, by varying the interrogating neutron flux to maximize the ratio of the useful signal to the nuisance signal, thereby increasing the detected useful signal's robustness.

While the present invention has been described in terms of the above-described embodiments and apparatuses, those skilled in the art will recognize that the invention is not limited to the embodiments described.

What is claimed is:

1. A method for interrogating an Area Under Investigation (AUI) with a neutron beam, causing gamma rays to be fluoresced from multiple substances in multiple locations within the AUI, possibly including from one or more substances of interest within the AUI, said method comprising the steps of:

providing an agile neutron source;

producing a neutron beam from the neutron source, the neutron beam having a definable flux attribute ($\phi_{Illumination}$);

assessing the distance from the neutron source to the AUI;

illuminating the AUI with the neutron beam;

detecting useful fluorescence gamma ray signals ($\phi_{Useful}$) from the AUI in response to the neutron beam's interaction with substances present contained in the AUI, while also detecting unwanted nuisance signals ($\phi_{Background}$);

indiscriminately receiving the useful gamma ray signals ($\phi_{Useful}$) together with the unwanted nuisance signals ($\phi_{Background}$) in a detector; and modulating the neutron beam flux ($\phi_{Illumination}$) to adjust the production of unwanted nuisance signals ($\phi_{Background}$) to optimal levels by whereby such parameters as the signal-to-noise ratio (SNR) received by the detector or other detection parameters such as Integration Time are improved.

2. The method of claim 1, wherein said step of adjusting the production of unwanted nuisance signals ($\phi_{Background}$) includes modulating the neutron beam flux ($\phi_{Illumination}$) as a function of the assessed distance from the neutron source to the AUI.

3. The method of claim 1, wherein said step of assessing the distance from the neutron source to the AUI includes at least one of optically, reflectively, and acoustically determining the distance.

4. The method of claim 1, wherein said step of adjusting the production of unwanted nuisance signals ($\phi_{Background}$) includes modulating the neutron beam flux ($\phi_{Illumination}$) as a function of a sensor fusion product derived from signals received from a plurality of sensor channels.

5. The method of claim 1, further including the step of scanning the neutron beam across a search area.

6. The method of claim 1, wherein said step of adjusting unwanted nuisance signals ($\phi_{Background}$) includes reducing the signal to noise ratio (SNR) according to the formula:

$$SNR = \phi_{UsefulSignal}/\phi_{RandomSumming} = K_1\phi_{Illumination}/K_2\tau\phi^2_{Illumination} = K_1/K_2\tau\phi_{Illumination}$$

where $\phi_{RandomSumming}$ is the totality of all random-summing background flux events;

$K_1$ and $K_2$ are experimentally determined proportionality constants that take into account the cross sections of the nuclides in the AUI, the distance, and other factors; and $\tau$ is the time constant of the detector.

7. A method for interrogating an Area Under Investigation (AUI) with a neutron beam causing gamma rays to be fluoresced from multiple substances in multiple locations within the AUI, possibly including from one or more substances of interest within the AUI, said method comprising the steps of:

providing an agile neutron source;

producing a neutron beam from the neutron source, the neutron beam having a definable flux attribute ($\phi_{Illumination}$);

interrogating an AUI with the neutron beam and producing a returning gamma ray flux ($\phi_{GammaReturn}$), the returning gamma ray flux ($\phi_{GammaReturn}$) containing both useful gamma ray signals ($\phi_{useful}$) together with the unwanted nuisance signals ($\phi_{Background}$), whereby the useful gamma ray signals ($\phi_{Useful}$) arise from interaction of the neutron beam with a substance of interest in the AUI;

assessing the distance (x) from the neutron source to the AUI;

calculating the returning gamma ray flux ($\phi_{GammaReturn}$) according to the formula:

$$\phi_{GammaReturn} = K \cdot \phi_{Illumination} \cdot \frac{e^{-\frac{x}{22}} \cdot e^{-\frac{x}{80}}}{x^4} = K \cdot \phi_{Illumination} \cdot \frac{e^{-\frac{51x}{880}}}{x^4}$$

where K is a constant combining all neutron reaction cross sections and x is the range in meters;

indiscriminately receiving the returning gamma ray flux ($\phi_{GammaReturn}$) in a detector; and automatically improving the signal-to-noise ratio (SNR) between useful gamma ray signals ($\phi_{Useful}$) and unwanted nuisance signals ($\phi_{Background}$) by modulating the flux.

8. An apparatus for adjusting the signal-to-noise ratio (SNR) of a neutron fluorescence produced by an Area Under Investigation (AUI) by modulating the interrogating neutron flux ($\phi_{Illumination}$), said apparatus comprising:

a. an agile neutron source for producing a neutron beam capable of generating gamma rays upon interaction with a substance of interest, the neutron beam having a definable flux attribute ($\phi_{Illumination}$);

b. a range detector for assessing the distance from said neutron source to the AUI or its environment;

c. a signal detector configured to indiscriminately receive useful signals ($\phi_{Useful}$) produced by the AUI as well as unwanted nuisance signals ($\phi_{Background}$); and d. a flux rate controller responsive to inputs from said range detector and said signal detector for automatically modulating the neutron beam flux ($\phi_{Illumination}$) to adjust the return of unwanted nuisance signals ($\phi_{Background}$) whereby the signal-to-noise ratio (SNR) received by said gamma ray detector or other detection parameters such as Integration Time are improved.

9. The apparatus of claim 8, wherein said range detector is selected from the group consisting essentially of: an electromagnetic wave-based system, an optical-based system, a sonic-based system, an acoustic-based system, and a hybrid system, based on one or more single-modality-based systems.

10. The apparatus of claim 8, wherein said signal detector is selected from the group consisting essentially of: a gamma ray detection system, an X-ray detection system, an electromagnetic wave detection system, a neutron detection system, a proton detection system, an acoustic detection system, and a hybrid system, based on one or more single-modality-based systems.

11. The apparatus of claim 8, wherein said flux rate controller is selected from the group consisting essentially of: an analog system, a digital system, an optoelectronic system, and a hybrid system, based on one or more single-modality-based systems.

* * * * *